United States Patent
Mo et al.

(10) Patent No.: US 10,630,459 B2
(45) Date of Patent: Apr. 21, 2020

(54) SYNCHRONIZING AND ALIGNING SAMPLE FRAMES RECEIVED ON MULTI-COMPONENT SIGNALS AT A COMMUNICATIONS RECEIVER

(71) Applicant: VIASAT, INC., Carlsbad, CA (US)

(72) Inventors: Fan Mo, Hinckley, OH (US); Yuri Zelensky, Solon, OH (US); Murat Arabaci, Parma, OH (US); Chase B Nemeth-Neumann, Lakewood, OH (US); Eric A Fowlie, Middleburg Heights, OH (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 16/130,633

(22) Filed: Sep. 13, 2018

(65) Prior Publication Data

US 2020/0092076 A1    Mar. 19, 2020

(51) Int. Cl.
*H04L 7/00* (2006.01)
*H04L 7/033* (2006.01)

(52) U.S. Cl.
CPC .................................... *H04L 7/033* (2013.01)

(58) Field of Classification Search
CPC . H04L 7/033; H04L 27/2656; H04L 27/2678; H04L 27/2607
USPC .......................... 375/355, 354, 316, 295, 219
See application file for complete search history.

(56) References Cited

U.S. PATENT DOCUMENTS

| | | | |
|---|---|---|---|
| 5,646,947 | A | 7/1997 | Cooper et al. |
| 6,243,580 | B1 | 6/2001 | Garner |
| 7,596,323 | B1 | 9/2009 | Price et al. |
| 9,781,704 | B2 | 10/2017 | Park et al. |
| 2002/0107685 | A1 | 8/2002 | Yamazaki et al. |
| 2006/0045038 | A1 | 3/2006 | Kay et al. |

(Continued)

FOREIGN PATENT DOCUMENTS

CN         104935393        9/2015

OTHER PUBLICATIONS

"IP Core Technology Development and License Agreement No. TG20161121" (executed Dec. 19, 2016) (redacted), 19 pgs.

(Continued)

*Primary Examiner* — Zewdu A Kassa
(74) *Attorney, Agent, or Firm* — Tarolli, Sundheim, Covell & Tummino LLP

(57) ABSTRACT

A frame synchronization system and method is disclosed. The system can comprise controller, a search correlator, and a buffer. The controller can be configured to operate on a first stream of first digital sample blocks associated with a first signal and a second stream of second digital sample blocks associated with a second signal. The search correlator can be configured to determine an index of a first unique word (UW) pattern within first searchable digital sample blocks corresponding to the first digital sample blocks and an index of a second UW pattern within second searchable digital sample blocks corresponding to the second digital sample blocks. The buffer can be configured to store the first digital sample blocks and the second digital sample blocks and to release the buffered first and the second digital sample blocks for flow downstream when the stream of first digital sample blocks and the stream of second digital sample blocks are aligned.

28 Claims, 5 Drawing Sheets

(56) References Cited

U.S. PATENT DOCUMENTS

| | | |
|---|---|---|
| 2009/0190510 A1* | 7/2009 | Kobayashi .......... H04L 27/2656 |
| | | 370/280 |
| 2009/0190704 A1* | 7/2009 | Ben-Ari ................. H04L 7/042 |
| | | 375/365 |
| 2010/0027625 A1 | 2/2010 | Wik et al. |
| 2012/0230676 A1 | 9/2012 | Mo et al. |
| 2014/0079406 A1 | 3/2014 | Mo et al. |
| 2016/0373934 A1 | 12/2016 | Lee et al. |

OTHER PUBLICATIONS

"Amendment No. 01 to IP Core Technology Development and License Agreement No. TG20161121" (executed Aug. 31, 2017) (redacted), 2 pgs.

"IP Core Development & License Agreement No. 20161121", Exhibit B Specifications (Rev-A dated Jul. 31, 2017) (redacted), 12 pgs.

"IP Core Development & License Agreement No. 20161121", Exhibit C Customer Netlist Criteria (Dec. 16, 2016) (redacted), 20 pgs.

Onic, et al., "Direct vs. Two-Step Approach for Unique Word Generation in UW-OFDM" Institute of Networked and Embedded Systems, Alpen-Adria-Universitaet Klagenfurt, Austria, Sep. 17, 2010.

International Search Report dated Nov. 15, 2019 for corresponding PCT/US2019/050597.

* cited by examiner

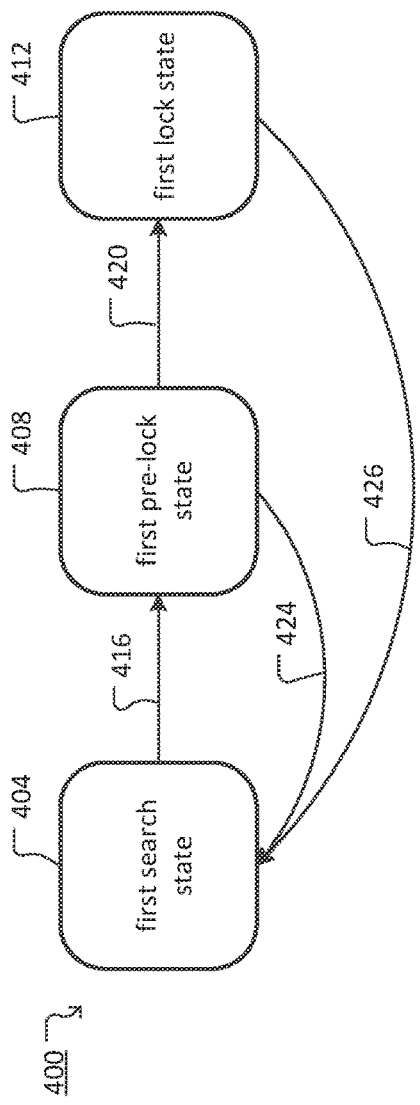
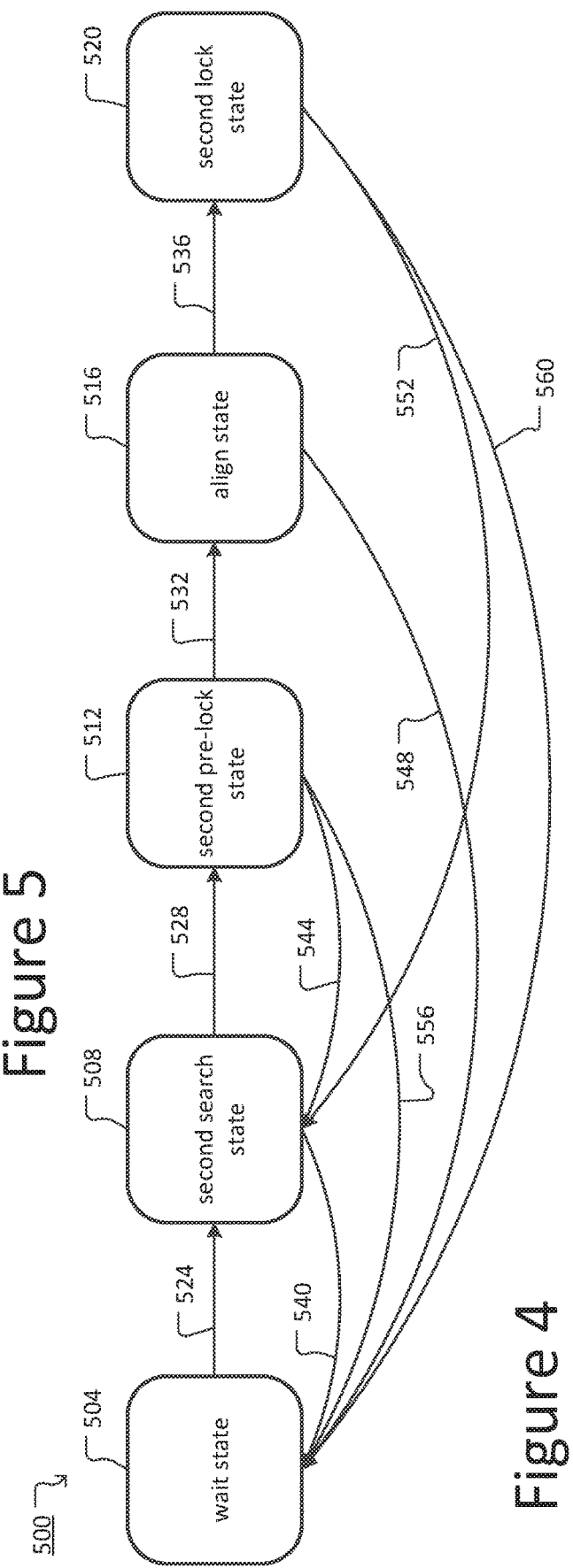
Figure 5
Figure 4

SYNCHRONIZING AND ALIGNING SAMPLE FRAMES RECEIVED ON MULTI-COMPONENT SIGNALS AT A COMMUNICATIONS RECEIVER

BACKGROUND

The demand for high-throughput data transmission is ever increasing. For example, there has been a growing need in the industry to achieve high-throughput data transmission at increasingly higher bandwidth efficiencies. This has given rise to the need for more efficient processing of received data in communications receivers.

BRIEF DESCRIPTION OF THE DRAWINGS

FIG. 4 is a state diagram illustrating an example of operation of a first state machine according to some embodiments of the invention.

FIG. 5 is a state diagram illustrating an example of operation of a second state machine according to some embodiments of the invention.

DETAILED DESCRIPTION OF EXEMPLARY EMBODIMENTS

This specification describes exemplary embodiments and applications of various embodiments of the invention. The invention, however, is not limited to the exemplary embodiments and applications or to the manner in which the exemplary embodiments and applications operate or are described herein. Moreover, the figures may show simplified or partial views, and the dimensions of elements in the figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements. As used herein, "substantially" means sufficient to work for the intended purpose. If used with respect to a numerical value or range, substantially means within ten percent. The term "ones" means more than one.

As used herein, the "location" of a sample in a stream of samples can be expressed as an "index" (e.g., an integer value) of the location of the sample, e.g., relative to a determined reference sample in the stream. If the stream of samples comprises a stream of sample blocks each comprising a predetermined number of samples, the index can be in the form of a first index identifying the block in which the sample is located relative to a determined reference block, which is also referred to herein as block index, and a second index identifying the location of the sample within the block relative to a determined reference sample. Thus, an example of any reference herein to the "location" of a sample can be an "index" of the sample.

Embodiments of the invention provide an improved system and process of finding and synchronizing to multi-component communications signals received at a communications receiver. Some embodiments provide improved operating and processing efficiency over prior systems and processes.

Figure 1:
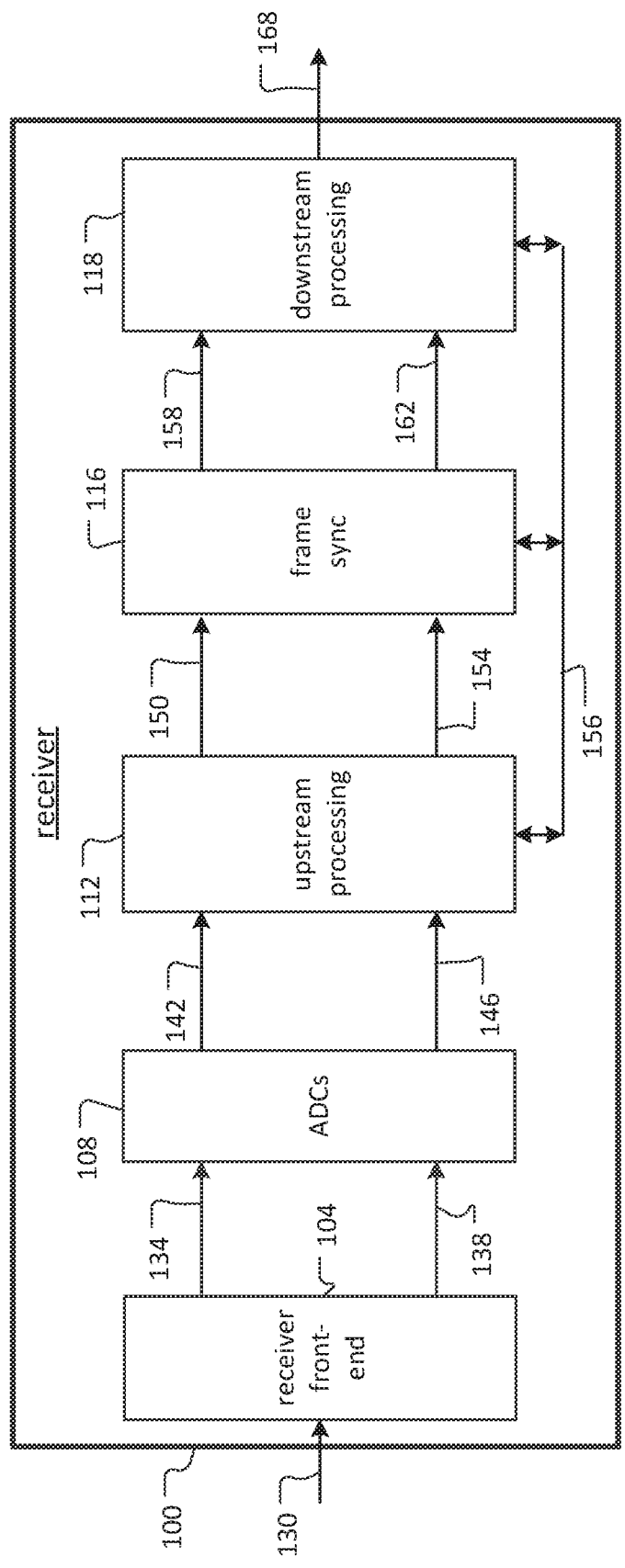
FIG. 1 illustrates an example of a telecommunications receiver according to some embodiments of the invention.

FIG. 1 illustrates a communications receiver 100 for receiving a multi-component communications signal 130 from a remote communications transmitter (not shown). The received signal 130 can comprise multiple signals each of which can carry independently-modulated client information, for example, in the form of quadrature modulated symbols. As shown, the receiver 100 can comprise a receiver front-end 104, analog to digital converters (ADCs) 108, various digital signal processing (DSP) modules collectively labeled upstream processing 112 in FIG. 1, a frame synchronization module 116, and various additional DSP modules collectively labeled downstream processing 118 in FIG. 1.

The multi-component signal 130 can be any type of communications signal including an optical signal or any other type of electromagnetic signal whether transmitted wirelessly or over a physical medium such as a fiber, cable, etc. A first component signal 134 and a second component signal 138 can be communications signals carrying client information, which may have been modulated as m-ary symbols. For example, the signals 134 and 138 can carry quadrature modulated symbols each of which comprises an in-phase (I) component and a quadrature-phase (Q) component. Examples of quadrature modulation formats include phase shift keying (PSK) and quadrature amplitude modulation (QAM) formats such as QPSK, 8-PSK, 8-QAM, 16-QAM, 32-QAM, 64-QAM, 128-QAM, 256-QAM, etc.

The first and second component signals 134 and 138 can be configured for minimal interference with each other. For example, the first and second component signals 134 and 138 can be mutually orthogonal. A non-limiting example of a multi-component signal 130 is a dual-polarization optical signal in which the component signals 134 and 138 are mutually orthogonal optical signals. For example, the first component signal 134 can be a horizontally polarized optical signal, and the second component signal 138 can be a vertically polarized optical signal 138.

As shown, the receiver front-end 104 can receive the multi-component signal 130 and split it into its first and second component signals 134 and 138. Although not shown, if the received multi-component signal 130 is an optical signal, the optical signal can be converted from an optical signal to an electrical signal within the receiver front-end 104. As noted, if the multi-component signal 130 is a dual-polarization optical signal, the first component signal 134 can correspond to the horizontally polarized signal and the second component signal 138 can correspond to the vertically polarized signal.

The ADCs 108 can digitize the first component signal 134 and create a first digital sample stream 142, which thus comprises sequential digital samples of the first component signal 134. The ADCs 108 can similarly digitize the second component signal 138 and create a second digital sample stream 146, which thus comprises sequential digital samples of the second component signal 138. The upstream processing 112 can perform various DSP functions on the sample streams 142 and 146. Examples of such processing include signal conditioning such as compensation for various distortions and/or dispersions, resampling, symbol timing acquisition, and/or the like. A first sample stream output from the upstream processing 112 corresponding to the sample stream 142 is labeled 150 and a second sample stream output from the upstream processing 112 corresponding to the sample stream 146 is labeled 154 in FIG. 1. A first sample stream output from the frame synchronization module 116 corresponding to the sample stream 150 is referred to herein as a first synchronized sample stream 158, and a second sample stream output from the frame synchronization module 116 corresponding to the sample stream 154 is referred to as a second synchronized sample stream 162. Various additional DSP modules (collectively labeled downstream processing 118 in FIG. 1) further process the first and second synchronized sample streams 158 and 162, producing an information signal 168 that can be a faithful estimate of the information signal transmitted from a remote communications transmitter that was received as the multi-component signal 130. Examples of downstream processing 118 include symbol-to-bit conversion, forward error correction (FEC) decoding, and/or the like. Control signals 156 in FIG. 1 represents one or more control, monitor, and/or status signals, and/or various feedback/feedforward auxiliary signals and/or the like signals provided among the upstream processing 112, the frame synchronization module 116, and/or the downstream processing 118.

Figure 2:
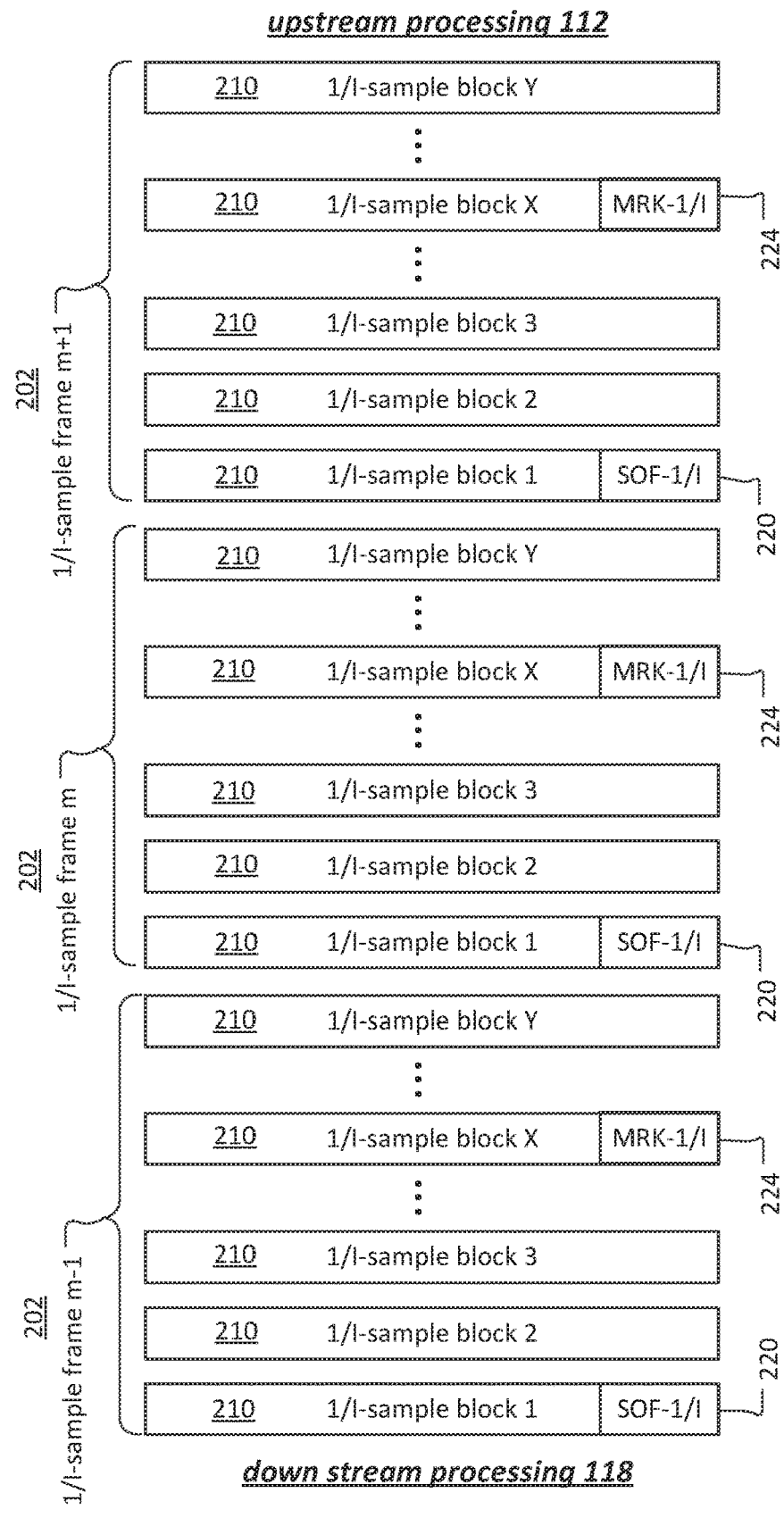
FIG. 2 illustrates an example of streams of sample blocks and sample frames according to some embodiments of the invention.

FIG. 2 illustrates an example of an I-component sample stream of the first sample stream 150 output by the upstream processing 112, referred to herein as a 1/I-sample stream, which effectively corresponds to a first component signal of the multi-component signal, which is comprised of the first and second component signals 150 and 154, at the input of the frame synchronization module 116. As shown, the 1/I-sample stream can comprise a stream of 1/I-sample blocks 210 each comprising a fixed number N of 1/I-samples. As also shown, a fixed number Y of 1/I-sample blocks 210 can compose a 1/I-sample frame 202. Such a sample block structure and sample frame structure facilitate parallel processing of each block of N samples received at each valid clock cycle, where a valid clock cycle corresponds to a clock cycle in which the corresponding input sample block carries valid data samples. N can be any integer number of samples, such as 128 samples, 256 samples, or the like. Choosing N as an integer that is also a power of 2 can facilitate hardware implementation. Also, Y can be any integer number of 1/I-sample blocks 210, such as 50, 100, 150, or the like. Furthermore, each 1/I-sample frame 202 can be marked by a distinct sample pattern that is readily identifiable, e.g., by correlation. For example, a distinct sample pattern SOF-1/I 220 can mark the start of each 1/I-sample frame 202 and be located at the beginning of each 1/I-sample frame 202 (e.g., the first few samples of the first 1/I-sample block 210 in a 1/I-sample frame 202 can comprise the samples of SOF-1/I 220 pattern). Consequently, the SOF-1/I 220 can be said to have an SOF period of Y 1/I-sample blocks, or equivalently, Y valid clock cycles. Sometimes such a distinct sample pattern is referred to in the industry as a unique word. Although shown located at the start of each 1/I-sample frame 202, the SOF-1/I 220 can alternatively be in other locations in each 1/I-sample frame 202, such as at any interior location in or at the end of each 1/I-sample frame 202. In some embodiments, the location of the SOF-1/I 220 can be provided by an index (e.g., an integer value) to the first sample of the SOF-1/I 220, referred to herein as an SOF-1/I start index. The SOF-1/I start index can be from a determined reference sample.

In some embodiments one or more of the intermediate 1/I-sample blocks 210 between the first 1/I-sample block 210 and the last ($Y^{th}$) 1/I-sample block in a 1/I-sample frame 202 can comprise one or more additional distinct symbol patterns. In the example illustrated in FIG. 2, the $X^{th}$ 1/I-sample block 210 in each 1/I-sample frame 202 includes a secondary distinct sample pattern MRK-1/I 224. The $X^{th}$ 1/I-sample block 210 can be, for example, at the middle or approximately middle of each 1/I-sample frame 202, and the sample pattern MRK-1/I 224 can thus identify the middle or approximately middle of each 1/I-sample frame 202.

The sample block and sample frame structures depicted in FIG. 2 and described above for the 1/I-sample stream, e.g., the first component signal of the first component signal of the multi-component signal at the input of the frame synchronization module 116, can apply to all component signals of the multi-component signal at the input of the frame synchronization module 116. For example, a Q-component sample stream of the first sample stream 150 output by the upstream processing 112, referred to herein as a 1/Q-sample stream (not shown), can represent a second component signal of the first component signal of the multi-component signal at the input of the frame synchronization module 116. The 1/Q-sample stream can comprise a stream of 1/Q-sample blocks (not shown) structured the same as the 1/I-sample blocks 210. Also, Y of 1/Q-sample blocks can form a 1/Q-sample frame (not shown) structured the same as the 1/I-sample frame 202, and a distinct sample pattern SOF-1/Q (not shown) can mark the start of each 1/Q-sample frame in the same manner that the SOF-1/I 220 does for each 1/I-sample frame 202. Also, a distinct MRK-1/Q pattern can mark the middle or approximately middle of each 1/Q-sample frame as the MRK-1/I 224 does for each 1/I-sample frame 202. Similarly, the second sample stream 154, i.e., a second component signal of the multi-component signal at the input of the frame synchronization module 116, can be further decomposed into its component signals. For example, a 2/I-sample stream (not shown) and a 2/Q-sample stream (not shown) can comprise the second sample stream 154 in a similar fashion that the 1/I- and 1/Q-sample streams comprise the first sample stream 150. The 2/I- and 2/Q-sample streams can have the same sample block and sample frame structures as the 1/I-sample stream as depicted in FIG. 2 such that they are comprised of 2/I- and 2/Q-sample blocks (not shown) and 2/I- and 2/Q-sample frames (not shown), respectively. A distinct sample pattern SOF-2/I and a distinct sample pattern SOF-2/Q can mark the start of each 2/I-sample frame and each 2/Q-sample frame, respectively. Similarly, distinct MRK-2/I and MRK-2/Q patterns can mark the middle or approximately middle of each 2/I- and 2/Q-sample frame, respectively. Moreover, such descriptions can be extended to any multi-component signal with any number of component signals at the input of the frame synchronization module 116 in a straightforward manner. For example, a multi-component signal composed of A number of component signals each of which can be further composed of B number of component signals can be represented as a/b-sample streams associated with a/b-sample blocks, a/b-sample frames, and distinct sample patterns SOF-a/b marking the start of corresponding a/b-sample frames, where a is any member of the set of integers 1 through A and b is any member of the set of integers from 1 through B. In the following, without loss of generality, processing of a multi-component signal at the input of the frame synchronization module 116 comprised of 1/I-, 1/Q-, 2/I- and 2/Q-sample streams is discussed.

As noted, the 1/I-sample stream and the 1/Q-sample stream can comprise the first sample stream 150 at the input of the frame synchronization module 116. The corresponding 1/I- and 1/Q-samples, e.g., at the same sample index with respect to the starting sample of the sample block that they belong to, in the 1/I- and 1/Q-sample streams can be said to form a (1/I,1/Q)-sample pair, and hence, the first sample stream 150 can equivalently be described as a (1/I,1/Q)-sample-pair stream. The sample block and sample frame structures of FIG. 2 can thus be extended to sample-pair block and sample-pair frame structures with each element in a sample-pair block being an (I,Q)-sample pair. Similarly, a pair of SOF-1/I 220 and SOF-1/Q sample patterns contained in the 1/I- and 1/Q-sample blocks received in the same valid clock cycle can be denoted as SOF-1/* patterns that herein refers to the SOF patterns of the (1/I,1/Q)-sample-pair frames. Similarly, SOF-2/* patterns composed of a corresponding pair of SOF-2/I and SOF-2/Q patterns is herein used to refer to the SOF patterns of the (2/I,2/Q)-sample-pair frames. Similarly, MRK-1/* and MRK-2/* patterns can mark the middle or approximately middle of each (1/I,1/Q)-sample-pair frame and (2/I,2/Q)-sample-pair frame, respectively. In some embodiments, the location of the SOF-1/* patterns can be provided by an index (e.g., an integer value) to the first sample pair of the SOF-1/*, referred to herein as an SOF-1/* start index. The SOF-1/* start index can be from a determined reference sample. Similar indices can be defined for SOF-2/*, MRK-1/* and MRK-2/*.

Although not shown, each sample-pair block can comprise sample pairs associated with different modulation formats. For example, each sample-pair block can comprise sample pairs modulated in a first modulation format and sample pairs modulated in a second and different modulation format. In addition, the sample pairs representing the SOF and MRK patterns, e.g., the SOF-1/*, SOF-2/*, MRK-1/*, and MRK-2/*, can be modulated in the first modulation format, the second modulation format, or a third and different modulation format. Examples of suitable modulation formats include those mentioned above.

The SOF-1/I 220, SOF-1/Q, SOF-2/I and SOF-2/Q can be distinctly different from one another, allowing their corresponding 1/I-, 1/Q-, 2/I- and 2/Q-sample streams to be readily distinguished from one another. Likewise, if included, the MRK-1/I 224, MRK-1/Q, MRK-2/I and MRK-2/Q can be distinctly different from one another and from each of the SOF patterns, i.e., SOF-1/I 220, SOF-1/Q, SOF-2/I and SOF-2/Q.

In addition, in some embodiments, each of the SOF-1/I 220, SOF-1/Q, SOF-2/I and SOF-2/Q may have been designed to comprise a first distinct sample pattern when differentially decoded at the receiver 100 and a different distinct sample pattern when not differentially decoded.

Functions of the frame synchronization module 116 is to find, lock onto, and/or maintain lock on the boundaries of sample frames in the 1/I- and 1/Q-sample streams of the first sample stream 150 and in the 2/I- and 2/Q-sample streams of the second sample stream 154. The frame synchronization module 116 can indicate that frame synchronization is acquired by asserting a frame sync signal. While the frame sync signal remains asserted, i.e., the frame sync is maintained, the frame synchronization module 116 can output the first synchronized sample stream 158 and the second synchronized sample stream 162.

Due to distortions, anomalies, impairments, etc. that can occur at the transmitter (not shown) and/or during transmission, the sample frames in the 1/I- and 1/Q-sample streams of the first sample stream 150 and in the 2/I- and 2/Q-sample streams of the second sample stream 154 may not be as expected. For example, the SOF-1/I 220 and/or MRK-1/I 224 might not be at their expected locations in the 1/I-sample blocks 210 of each 1/I-sample frame 202. Similarly, the SOF-1/Q, SOF-2/I, SOF-2/Q and the MRK-1/Q, MRK-2/I, MRK-2/Q might not be at their expected locations in their respective sample streams. Thus, the frame synchronization module 116 can determine locations of SOF patterns, and if applicable, MRK patterns, in its incoming first and second signal streams 150 and 154, and provide information about any unexpected occurrences to the upstream processing 112 and/or the downstream processing 118. It can continue performing such functionality until the receiver 100 operates as expected; for example, until the frame synchronization module 116 locates expected SOF patterns at their expected indices within the expected sample blocks in the expected valid clock cycles. The operations carried out by the frame synchronization module 116 in collaboration with the upstream processing 112 and/or downstream processing 118 can be referred to herein as frame sync acquisition processes of the frame synchronization module 116, and correspondingly, the frame synchronization module 116 can be said to operate in its first phase, i.e., a frame sync acquisition phase, while performing such operations to acquire a frame sync. Once the receiver 100 acquires the frame sync, then the receiver 100 can be said to operate as expected. As the frame sync is attained, the frame synchronization module 116 can be said to operate in its second phase, i.e., a frame sync maintenance phase, where it can perform tasks to verify that frame sync is maintained. In the second phase, the frame synchronization module 116 can verify that the receiver 100 continues to operate as expected; for example, in each valid clock cycle, the frame synchronization module 116 can verify that the expected SOF patterns can be found at their expected indices within the expected sample blocks. If it detects a predetermined number of anomalies, it can transition to the frame sync acquisition phase and inform the upstream processing 112 and/or the downstream processing 116 as discussed, and remain in this phase until the anomalies are corrected for and the receiver 100 operates as expected, after which it can transition to the frame sync maintenance phase. The frame synchronization module 116 can operate in this manner from power-up to power-down.

Figure 3:
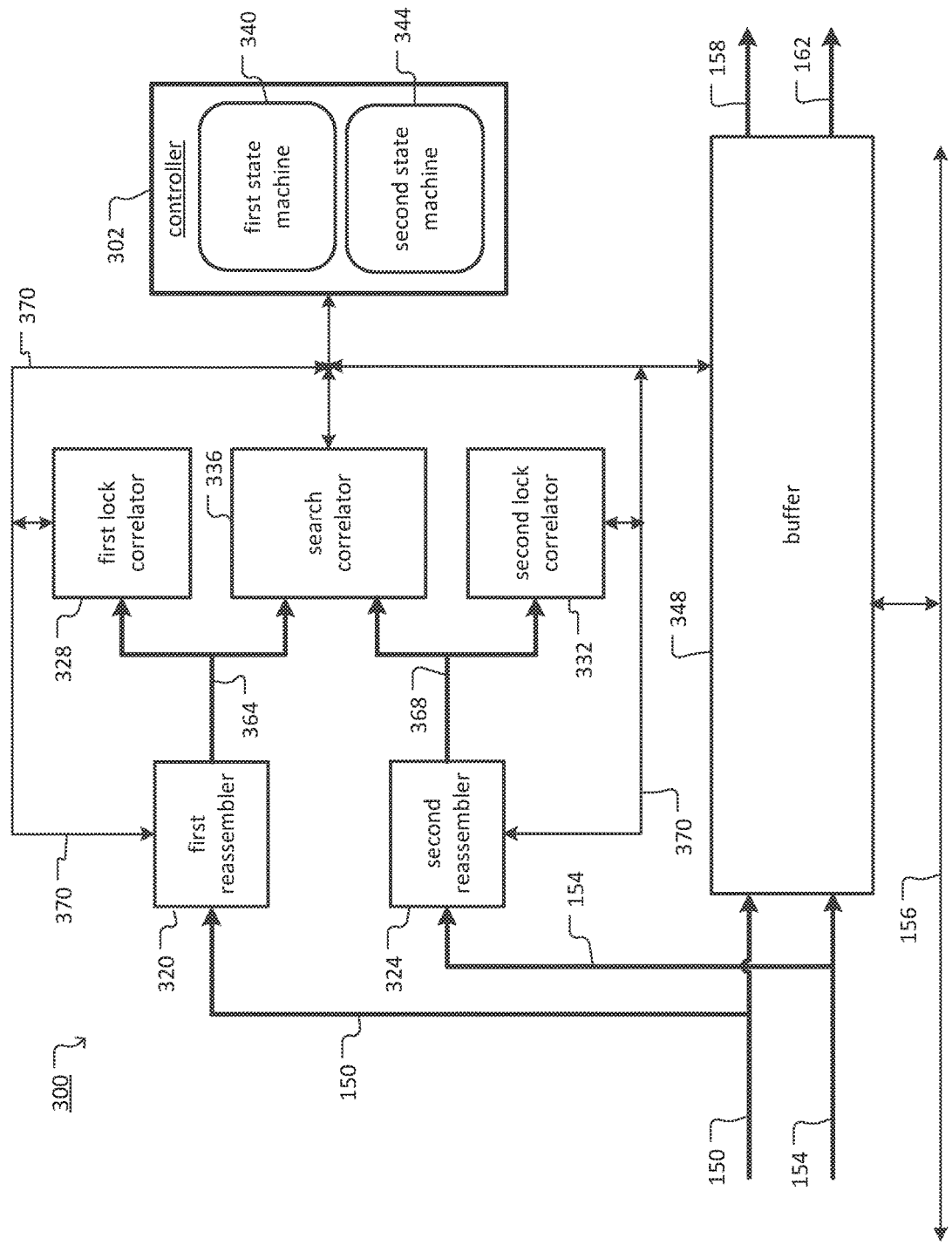
FIG. 3 shows an example configuration of a frame synchronization module according to some embodiments of the invention.

FIG. 3 illustrates an example embodiment 300 of the frame synchronization module 116 of FIG. 1. The embodiment 300, however, is just an example, and the frame synchronization module 116 is not limited to the specific embodiment 300 shown in FIG. 3.

As shown, the frame synchronization module 300 can comprise a buffer 348, a search correlator 336, and a controller 302, which comprises a first state machine 340 and a second state machine 344. (The first state machine can be an example of a first controller, and the second state machine can be an example of a second controller.) The frame synchronization module 300 can further include first and second reassemblers 320 and 324 and first and second lock correlators 328 and 332. Various control, monitoring, and/or status signals, and/or various feedback/feedforward auxiliary signals (collectively labeled in FIG. 3 and referred to herein as signals 370) can be exchanged between different elements of the frame synchronization module 300.

The buffer 348 can be controlled (e.g., by signals 370) to buffer the sample blocks of the incoming first and second sample streams 150 and 154. In some embodiments, the incoming sample blocks from the first and second sample streams 150 and 154 can be concatenated and then flattened into a row of samples, referred to herein as a buffer block. Thus, each buffered block is twice as large as a sample block. In some embodiments, the buffer 348 might be capable of storing a plurality of buffer blocks. In some embodiments, the read and write operations of the buffer can be controlled independently, e.g., dual-port random access memory (RAM). In such cases, while a buffer location is being written to, another buffer location can be read from.

The read/write operations of the buffer 348 can be controlled by the control signals 370. In some embodiments, the buffer 348 can be configured to accept new blocks only after the frame synchronization module 116 has acquired the frame sync. For example, until the frame sync is attained, the buffer does not allow new blocks to be written into. Also, the buffer can be configured to read from the same address until the frame sync is acquired, which corresponds to the frame synchronization module 116 outputting the same block of samples, e.g., all zeros, that has reduced toggling activity and hence saving power. Once the frame synchronization module 116 acquires frame sync, the buffer can be written into with the first and second sample blocks from the input first and second sample streams 150 and 154. After a predetermined amount of delay, e.g., number of clocks equal to the buffer depth, the buffer presents the stored first and second sample streams as blocks of first and second synchronized sample streams 158 and 162, respectively, to the downstream processing 118.

The first reassembler 320 can receive the input (1/I,1/Q)-sample-pair stream 150 as illustrated in FIG. 3 and converts it into a searchable (1/I,1/Q)-sample-pair stream 364. The searchable (1/I,1/Q)-sample-pair stream 364 can comprise a stream of sample-pair blocks. For example, if there is a one-to-one correspondence between the sample pairs of the input (1/I,1/Q)-sample-pair stream 150 and the sample pairs of the searchable (1/I,1/Q)-sample-pair stream 364, each of the sample-pair blocks of the searchable (1/I,1/Q)-sample-pair stream 364 can comprise N sample pairs. Regardless, the searchable (1/I,1/Q)-sample-pair stream 364 can be a searchable representation of the input (1/I,1/Q)-sample-pair stream 150.

The first reassembler 320 can be selectively set to operate in either of two modes. In its differential mode, the first reassembler 320 differentially decodes the sample pairs in the input (1/I,1/Q)-sample-pair stream 150, and generates differentially-decoded searchable (1/I,1/Q)-sample pairs, which form a differentially-decoded searchable (1/I,1/Q)-sample-pair stream 364.

Differential decoding of (I,Q) samples is known, and any known or later developed differential decoding technique can be used by the first reassembler 320. For example, differential decoding a received (I,Q)-sample-pair stream can involve determining new sample pairs from transitions between the received sample pairs. For example, in every valid clock cycle, each (I,Q)-sample pair in a received (I,Q)-sample-pair block containing a plurality of, say N, (I,Q)-sample pairs can be multiplied with the complex-conjugate of the respective preceding (I,Q)-sample pair and the resulting (I,Q)-sample pair can then be passed through a respective one of N slicers (not shown), where a slicer is a device that can map an input (I,Q)-sample pair to an output (I,Q)-sample pair representing the determined centroid of the decision region that the input (I,Q)-sample pair falls to. The slicers are applied to all N (I,Q)-sample pairs in a given (I,Q)-sample-pair block, and the decision regions of the slicers can be optimized to generate a searchable (I,Q)-sample-pair stream. For example, the slicers and their decision regions can be optimized based on the modulation formats associated with the SOF patterns independently of the other modulation formats that might have been associated with the other sample pairs of the input (I,Q)-sample-pair block. For example, the (I,Q)-sample pairs of the SOF patterns might be modulated with the QPSK modulation while some other (I,Q)-sample pairs present in the (I,Q)-sample-pair stream might be modulated with other modulation formats, e.g., 16-QAM, 64-QAM, etc. Regardless, all N (I,Q)-sample pairs obtained after the complex-conjugate multiplication operations can be converted into new (I,Q)-sample pairs through slicers operating per QPSK decision regions. If the complex-conjugate multiplication operation is followed by a slicer, as described above, then the operation can be said to have generated hard-decision (I,Q)-sample pairs. If instead of a slicer, a device that maps an input (I,Q)-sample pair to a value or a set of values that represent the distance, e.g., Euclidean distance, between the input (I,Q)-sample pair and each (I,Q)-sample pair representing the determined centroids of the decision regions is used after the complex-conjugate multiplication operations, the resulting (I,Q)-sample-pair stream can be referred to as a differentially-decoded searchable soft (I,Q)-sample-pair stream. Although both can be used in different embodiments of this invention, generating hard-decision (I,Q)-sample-pair streams and performing SOF pattern searches in them would generally result in comparatively more power- and area-efficient process that is also of comparatively lower latency. Without loss of generality, it is herein assumed that while operating in its differential mode, the first reassembler uses hard-decision slicers. Furthermore, all the complex-conjugate multiplication and slicing operations can be carried in serial or in parallel, where the latter helps reduce processing latency. Thus, in one embodiment, the first reassembler 320 can differentially decode the (1/I,1/Q)-sample pairs in the input (1/I,1/Q)-sample-pair stream 150 to generate differentially-decoded searchable (hard) (1/I,1/Q)-sample-pair stream 364.

In its non-differential mode, also referred to as its coherent mode, the first reassembler 320 can directly apply N hard-decision slicers to the respective N (1/I,1/Q)-sample pairs of the (1/I,1/Q)-sample pair stream 150 and generate searchable (hard) (1/I,1/Q)-sample-pair stream 364. As noted, it is also possible to generate a searchable soft (1/I,1/Q)-sample pair stream for use with this invention. However, without loss of generality, it is herein assumed that in its non-differential mode, the first reassembler uses hard-decision slicers.

The second reassembler 324 can operate generally the same as the first reassembler 320 but receive as input the input (2/I,2/Q)-sample-pair stream 154. The second reassembler 324 can thus selectively operate in its differential mode featuring N hard-decision slicers to produce a differentially-decoded searchable (hard) (2/I,2/Q)-sample-pair stream 368 from the input (2/I,2/Q)-sample-pair stream 154. In its non-differential mode, the second reassembler 324 can convert N (I,Q)-sample pairs in the (2/I,2/Q)-sample-pair stream 154 into a searchable (2/I,2/Q)-sample-pair stream 368 through N hard-decision slicers without differential decoding.

The state (differential or non-differential) of the first reassembler 320 and the second reassembler 324 can be controlled by signals 370. In both the differential and non-differential modes, the sample pairs in the searchable (I,Q)-sample-pair streams 364 and 368 produced by the first reassembler 320 and the second reassembler 324 can be one-bit hard-decision (I,Q)-sample pairs, further reducing the complexity and hence the power consumption of the subsequent correlation operations performed while searching for permissible SOF patterns, e.g., the SOF-1/I 220, SOF-1/Q, SOF-2/I, SOF-2/Q and/or permissible MRK patterns, e.g., the MRK-1/I 224, MRK-1/Q, MRK-2/I, MRK-2/Q, within the searchable (I,Q)-sample pairs output by the first and second reassemblers 320 and 324.

The search correlator 336 can receive as inputs the differentially-decoded (1/I,1/Q)-sample-pair stream 364 and the differentially-decoded (2/I,2/Q)-sample-pair stream 368, but in each valid clock cycle, it operates only on one of its input streams as controlled by control signals 370 issued by the controller 302. Regardless of which input stream it operates on, it can perform the same operations on its input (I,Q)-sample-pair stream. Therefore, in the following description, the differentially-decoded searchable (1/I,1/Q)-sample-pair stream is assumed as input to the search correlator 336.

In some instances, it might be unknown which one of the permissible SOF patterns that an input sample-pair stream carries. In some cases, even if which one of the permissible SOF patterns that the input sample-pair stream carries might be known, it might be unknown which sample-pair blocks in the input sample-pair stream carry SOF patterns. In some other cases, even if which sample-pair blocks carry SOF patterns might be known, the SOF start index in each sample-pair block carrying the SOF patterns might be unknown. The search correlator 336 can be configured to determine whether the sample-pair blocks of the input differentially-decoded searchable (1/I,1/Q)-sample-pair stream carries the differentially-decoded SOF-1/* patterns or the differentially-decoded SOF-2/* patterns, which indicates whether the input (1/I,1/Q)-sample-pair stream is associated with the first or the second component signal of the multi-component signal sent by the transmitter (not shown), respectively. Hence, in each valid clock cycle, the input (I,Q)-sample-pair block received in that clock cycle is searched through correlations. This can be done by performing cross-correlations between the permissible SOF patterns, i.e., the differentially-decoded SOF-1/* and the differentially-decoded SOF-2/* patterns of length, say S, and N different length-S subsets of the input (I,Q)-sample-pair block. The N candidate length-S subsets of the input (I,Q)-sample-pair block are formed by taking the sample pairs 1 thru S for subset 1, the sample pairs 2 thru (S+1) for subset 2, the sample pairs 3 through (S+2) for subset 3, and so on, akin to a sliding window of length S passing through the sample pairs of the input (I,Q)-sample-pair block. In order to form such N candidate length-S subsets, the input (I,Q)-sample-pair block is prepended by (S−1) samples from the tail end of the preceding (I,Q)-sample-pair block reserved in memory in the corresponding preceding valid clock cycle. In some embodiments, such a series of correlations is conducted serially, whereas in some other embodiments, it is performed in a massively parallel fashion, where the latter can significantly reduce processing latency. Thus, the search correlator searches for the permissible SOF patterns, i.e., differentially-decoded SOF-1/* patterns and the differentially-decoded SOF-2/* patterns, within the input differentially-decoded searchable (1/I,1/Q)-sample-pair stream.

Once the search correlator 336 finds a hit, it terminates its search and reports to the controller 302 which one of the differentially-decoded SOF patterns was found in the input sample-pair stream. The search correlator 336 also reports the valid clock cycle in which the hit was obtained, which serves as a reference valid clock cycle, or equivalently, as a reference sample-pair block index for use in further processing of the input searchable (1/I,1/Q)-sample-pair stream. The search correlator 336 also reports the reference SOF-1/* start index within the reference (1/I,1/Q)-sample-pair block. The search correlator 336 then waits for further instructions from the controller 302, and when instructed so by the controller 302, the search correlator performs the same operations on the differentially-decoded searchable (2/I,2/Q)-sample-pair stream.

It is possible that the search correlator 336 finds the differentially-decoded SOF-2/* patterns in the input (1/I,1/Q)-sample-pair stream. Subsequently, if the search correlator 336 finds the differentially-decoded SOF-1/* patterns in the differentially-decoded searchable (2/I,2/Q)-sample-pair stream, then the search correlator 336 can declare that the first component signal and the second component signal of the multi-component signal sent by the transmitter (not shown) got swapped before reaching the frame synchronization module 116 of the receiver 100. The controller 302 can inform the downstream processing 118 and/or the upstream processing 112 about the detected swap condition, and request for a corrective swap that undoes the effect of the detected swap. Furthermore, the search correlator is configured to determine for a given input (I,Q)-sample-pair stream whether any rotations occurred in the IQ space, i.e., whether upstream processing 112 failed to discern the correct orientation of the IQ space. For example, for rectangular QAM modulation formats, the upstream processing 112 might not be able to distinguish between 90-degree rotations of a sample constellation diagram. For example, assuming that the input (I,Q)-sample-pair stream has a match for SOF-1/* patterns, in the case of a 90-degree rotation in the input (I,Q)-sample-pair stream, one would detect negative SOF-1/Q in the 1/I-sample stream and SOF-1/I in the 1/Q-sample stream.

The first lock correlator 328 can be selectively set (e.g., by control signals 370) to search the searchable (1/I,1/Q)-sample-pair stream 364 output by the first reassembler 320 for the differential or non-differential versions of expected SOF patterns, i.e., either the SOF-1/* patterns or the SOF-2/* patterns, at expected SOF start index within each expected valid sample-pair block, i.e., in each expected valid clock cycle. The controller 302 instructs the first lock correlator 328 via the control signals 370 to search for the expected SOF patterns, i.e., either the SOF-1/* patterns or the SOF-2/* patterns, and provides an enable signal (not shown) that activates the first lock correlator 328 in the expected valid clock cycles so that the first lock correlator 328 can verify the existence of the expected SOF patterns at the expected SOF start index of the respective sample-pair block in that valid clock cycle. When the enable signal to the first lock correlator 328 (not shown) is not asserted, the first lock correlator 328 remains inactive, saving power. The controller 302 determines when to enable/disable the first lock correlator 328, which SOF patterns to search for in the first lock correlator 328 and the expected SOF start index of the SOF patterns either based on the information that it gained from the search correlator 336. The controller 302 uses the following information that it gathered from the search correlator 336: 1) which one of the differentially-decoded SOF patterns, e.g., the differentially-decoded SOF- 1/* patterns or the differentially-decoded SOF-2/* patterns, were found to exist in the differentially-decoded searchable (1/I,1/Q)-sample-pair stream by the search correlator 336; and 2) in which valid clock cycle, the differentially-decoded SOF patterns were found by the search correlator 336. Since there is a one-to-one correspondence between valid clock cycles and valid (I/Q)-sample-pair blocks, given that the initial valid clock cycle in which the SOF patterns were found is determined by the search correlator 336, the consecutive expected valid clock cycles can be determined by incrementing the preceding expected clock cycle by the SOF pattern period of Y valid clock cycles (or Y valid sample-pair blocks). Thus, the first lock correlator 328 verifies that there exist expected SOF patterns at the expected SOF pattern start indices within the expected (1/I,1/Q)-sample-pair blocks of the expected (1/I,1/Q)-sample-pair frames in the expected valid clock cycles. If desired, the first lock correlator 328 can selectively be set to additionally or alternatively search for additional expected intermediary distinct sample patterns such as the MRK-1/* and MRK-2/* as noted, at expected pattern start indices within expected (1/I,1/Q)-sample-pair blocks of expected (1/I,1/Q)-sample-pair frames of the (1/I,1/Q)-sample-pair stream 364 in the expected valid clock cycles. The first lock correlator 328 can also be configured to notify the controller 302 each time it finds and/or does not find the expected SOF patterns at the expected locations. Alternatively, the first lock correlator 328 can be configured to notify the controller 302 about whether a predetermined number of the expected SOF patterns could not be found at the expected locations.

When enabled by the controller 302 in each expected valid clock cycle, the second lock correlator 332 can be selectively set (e.g., by control signals 370) to verify the existence of the expected SOF patterns, i.e., either the SOF-1/* patterns or the SOF-2/* patterns, at an expected SOF start index in expected sample-pair blocks of the searchable (2/I,2/Q)-sample-pair stream 368 output by the second reassembler 324. If the second sample stream 154 (and equivalently, the searchable (2/I,2/Q)-sample-pair stream 368) includes additional intermediary symbol patterns such as MRK-1/* and MRK-2/* as noted, the second lock correlator 332 can selectively be set to additionally or alternatively verify the existence of such sample patterns at an expected pattern start index within expected (2/I,2/Q)-sample-pair blocks of the searchable (2/I,2/Q)-sample-pair stream 368. The second lock correlator 332 can also be configured to notify the controller 302 each time it finds and/or does not find the expected SOF patterns at the expected locations. Alternatively, the second lock correlator 332 can be configured to notify the controller 302 whether a predetermined number of the expected SOF patterns could not be found at the expected locations.

The foregoing descriptions of the exemplary embodiment 300 of the frame synchronization module 116 are examples only. Operations of each element of the frame synchronization module 300, whether the element is described is configured to perform or able to perform the operation, are examples and the elements are not so limited.

FIG. 4 illustrates, in the form of a state diagram 400, an example of operation of the first state machine 340.

As will be discussed, the first state machine 340 and the second state machine 344 indicate that they have achieved their respective frame locks by asserting a 1-Lock signal and a 2-Lock signal, respectively. The assertion of the 2-Lock signal is, among many other factors, contingent upon whether the 1-Lock signal remains asserted. For example, when the 1-Lock signal gets deasserted, so does the 2-Lock signal. Furthermore, the assertion of the 2-Lock signal indicates not only that the second state machine 344 achieved the frame lock but also the frame synchronization module 116 has achieved the frame sync, which indicates that the frame synchronization module 116 completed its first phase, i.e., the frame sync acquisition phase, as discussed above. Thus, the 2-Lock signal of the second state machine 344 is the same as the frame sync signal of the frame synchronization module 116, indicating that the frame synchronization module 116 has completed its frame sync acquisition processes and transitioned to performing its frame sync maintenance processes. Furthermore, the frame sync signal, i.e., the 2-Lock signal, also controls the operating mode of the first and second reassemblers 320 and 324 and the first and second lock correlators 328 and 332, as will be discussed below. When the frame sync signal, i.e., the 2-Lock signal, is deasserted, the frame synchronization module 116 can be said to be in the frame sync acquisition phase, and accordingly, the first and second reassemblers 320 and 324 and the first and second lock correlators 328 and 332 operate in their respective differential modes. When the frame sync signal, i.e., the 2-Lock signal, is asserted, the frame synchronization module 116 can be said to be in its frame sync maintenance phase, and accordingly, the first and second reassemblers 320 and 324 and the first and second lock correlators 328 and 332 transition to operating in their respective non-differential modes.

The first state machine 340 is configured to initialize at a first search state 404. In the first search state 404, the first reassembler 320 is configured to operate in its differential mode, and the search correlator 336 is configured to search the differentially-decoded searchable (1/I,1/Q)-sample-pair stream 364 output by the first reassembler 320 for the permissible SOF patterns, i.e., the differentially-decoded SOF-1/* patterns and the differentially-decoded SOF-2/* patterns. If the search correlator 336 does not find a hit for any of the permissible SOF patterns within the input stream 364, the first state machine 340 remains in this state 404. When the search correlator 336 finds a hit for one of the SOF patterns, it signals the find and reports to the controller 302 which one of the SOF patterns was found in the input stream 364 along with an indicator for the valid clock cycle during which the hit occurred, or, a sample-pair block index for the respective sample-pair block containing the detected SOF patterns, and an SOF start index for the detected SOF patterns within the sample-pair block in which they appear. The first state machine 404 then transitions through 416 to a first pre-lock state 408.

As noted, SOF patterns mark the start of sample-pair frames. Hence, once SOF patterns are found in a sample-pair frame of the input sample-pair stream 364, the same SOF patterns should appear in consecutive sample-pair frames of the input stream 364. The SOF patterns should appear at the same SOF start index within the corresponding sample-pair blocks of the consecutive sample-pair frames. The number of sample-pair blocks between the sample-pair blocks containing SOF patterns should thus match the SOF pattern period, e.g., the number of blocks in a sample-pair frame. In the first pre-lock state 408, the first reassembler 320 and the first lock correlator 328 are configured to operate in their respective differential modes. In the first pre-lock state 408, the first state machine 340 monitors the detection results of the first lock correlator 328 to verify that the expected SOF patterns, i.e., the SOF patterns determined to exist in the input stream 364 in the first search state 404 by the search correlator 336, can be found at the expected SOF start index in the expected sample-pair blocks of the differentially-decoded searchable (1/I,1/Q)-sample-pair stream 364 output by the first reassembler 320 in the expected valid clock cycles.

If the expected SOF patterns are found for a predetermined number of times at the expected locations as described above, then the first state machine 340 transitions through 420 to a first lock state 412. Alternatively, if the expected SOF patterns are not found for a predetermined number of times, then the first state machine 340 transitions through 424 back to the first search state 404.

When the first state machine 340 transitions to the first lock state 412, a 1-Lock signal is asserted notifying the controller 302 and the second state machine 344 that first state machine 340 has achieved the frame lock on the first sample stream 150. Similar to the first pre-lock state 408, in this state, the first state machine 340 monitors the status of the first lock correlator 328 to verify that the first lock correlator 328 continues to detect the expected SOF patterns, i.e., the SOF patterns that were determined to exist in the input stream 364 in the first search state 404 by the search correlator 336 and verified to exist in consecutive frames for a predetermined number of times in the pre-lock state 408, at the expected SOF start index in the expected sample-pair blocks of the input stream 364 output by the first reassembler 320 in the expected valid clock cycles. As the first lock correlator 328 continues to detect the expected SOF patterns at the expected locations, the first state machine 340 remains in the first lock state 412, keeping the 1-Lock signal asserted. If more than a predetermined number of SOF patterns could not be detected at the expected locations in consecutive sample frames, then the first state machine returns to the first search state 404 through 426, deasserting the 1-Lock signal.

As noted above, after the 2-Lock signal is asserted and as it remains asserted, the first and second reassemblers 320 and 324 and the first and second lock correlators 328 and 332 operate in their respective non-differential modes. However, the operation of the first state machine 340 does not get impacted by whether the first reassemblers 320 and the first lock correlators 328 operate in their respective differential or non-differential modes. The first state machine 340 continues to monitor the status of the first lock correlator 328 to verify that the first lock correlator detects the expected SOF patterns as described above (regardless of the first reassembler's and the first lock correlator's operation in their respective differential or non-differential modes).

Moreover, if the first sample stream 150 (and thus the searchable (1/I,1/Q)-sample-pair stream 364) includes additional intermediary distinct sample patterns, such as the MRK-1/* and MRK-2/* as noted above, the first lock correlator 328 can selectively be set to additionally or alternatively search for such patterns at expected locations in the searchable sample stream 364. The first lock correlator 328 can also be configured to notify the controller 302 each time it finds and/or does not find the expected SOF patterns at the expected locations. Alternatively, the first lock correlator 328 can be configured to notify the controller 302 about whether a predetermined number of the expected SOF patterns could not be found at the expected locations.

As the first state machine 340 continues to verify that the expected SOF patterns are found at the expected locations, it remains in the first lock state 412, keeping the 1-Lock signal asserted. However, if the expected SOF patterns and/or the expected MRK patterns could not be found for a predetermined number of times at their respective expected locations (e.g., as signaled by the first search correlator 336 to the controller 302 via signals 370), the frame lock on the first sample stream 150 can be presumed to have been lost, and hence the 1-Lock signal is deasserted, informing the controller 302 and the second state machine 344 that frame lock in the first sample stream 150 has been lost. Consequently, the first state machine 340 transitions through 426 back to the first search state 404. Moreover, the first state machine 340 might also transition through 426 back to the first search state 404 in response to another internal or external signal (not shown). An example of such a signal is a notice from the second state machine 344 to return to the first search state 404 or of an error.

The foregoing description of states 404, 408, and 412 of the first state machine 340 is an example and variations are possible. For example, more or fewer transitions between states are possible. Similarly, there may be more or fewer states. As yet another example, conditions other than those described above can cause transitions between states. Moreover, details of operations of the states discussed above are examples only and not intended to be limiting.

FIG. 5 illustrates, in the form of a state diagram 500, an example of operation of the second state machine 344 according to some embodiments of the invention.

The second state machine 344 is configured to initialize in a wait state 504. In this state, the second state machine 344 waits for the first state machine to assert 1-Lock signal, indicating that the first state machine 340 has locked onto frames in the first sample stream 150 and that it has entered the first lock state 412. Upon the assertion of the 1-Lock signal, the second state machine 344 transitions through 524 to a second search state 508.

An initial aspect of the second search state 508 is similar to the first search state 404. For example, in this state, the second reassembler 324 is configured to operate in its differential mode and the search correlator 336 is configured to search the differentially-decoded searchable (2/I,2/Q)-sample-pair stream 368 output by the second reassembler 324 for the permissible SOF patterns, i.e., the differentially-decoded SOF-1/* patterns and the differentially-decoded SOF-2/* patterns.

Upon finding one of the permissible SOF patterns in the input sample-pair stream 368, unlike the first state machine 340, the second state machine 344 is configured to perform certain checks. Examples of checks that can be performed may include the following. As one example, the SOF patterns found by the search correlator 336 while searching the differentially-decoded searchable (2/I,2/Q)-sample-pair stream 368 in the second search state 508 are compared to the SOF patterns that the search correlator 336 found while searching the differentially-decoded searchable (1/I,1/Q)-sample-pair stream 364 in the first search state 404. If the SOF patterns found in the input stream 368 are the same as the SOF patterns found in the input stream 364, then the first sample stream 150 and the second sample stream 154 can be said to both correspond to the same component signal of the multi-component signal sent by the transmitter due to an error or fault in the upstream processing 112. This condition is referred to herein as a component suppression error condition. Another example check and the associated error condition can be stated as follow. An error condition, referred to herein as a component mix-up error condition, is said to have occurred if the differentially-decoded (1/I,1/Q)-sample-pair stream 364 contains the SOF-2/* patterns while the differentially-decoded (2/I,2/Q)-sample-pair stream 368 contains the SOF-1/* patterns. This error condition is different than the component suppression error condition since in this case, although mixed up, both the distinct permissible SOF patterns are present in the first and second input sample streams 150 and 154 input to the frame synchronization module 116. Yet another example check is performed by determining whether there exists an offset between the SOF start indices of the SOF patterns found in the first and second sample streams 150 and 154, referred to herein as a first and second SOF start indices, respectively. This offset between the first and second SOF start indices is referred to herein as an SOF start index offset. If the SOF start index offset is beyond a predetermined acceptable range, then this error condition is referred to herein as an SOF start index overflow error condition. If, however, the SOF start index offset is within the predetermined acceptable range but is nonzero, then this error condition is referred to herein as a nonzero SOF start index offset error condition. In some embodiments, the predetermined acceptable range is zero offset.

In one embodiment, the second state machine can perform the following operations in response to the existence of the foregoing error conditions or lack thereof. If the 1-Lock signal remains asserted and the second state machine 344 cannot detect one of the permissible SOF patterns in the input sample-pair stream 368, then it remains in the second search state 508, continuing to search for one of the permissible SOF patterns in subsequent sample-pair blocks of the input sample-pair stream 368 in the respective subsequent valid clock cycles. Else, if the 1-Lock signal remains asserted and the second state machine 344 has detected one of the permissible SOF patterns in the input sample-pair stream 368, and none of the foregoing error conditions have occurred, then the second state machine 344 transitions through 528 to a second pre-lock state 512. Else, if the 1-Lock signal remains asserted and the second state machine 344 has detected one of the permissible SOF patterns in the input sample-pair stream 368, and one or both of the component suppression or the SOF start index overflow error conditions have occurred, then the second state machine 344 signals the controller 302, the upstream processing 112 and/or downstream processing 118 about the error conditions and remains in the second search state 508 to continue searching the subsequent sample-pair streams in the respective subsequent valid clock cycles until the mentioned error conditions are resolved. Else, if the 1-Lock signal remains asserted and the second state machine 344 has detected one of the permissible SOF patterns in the input stream 368, and neither the component suppression nor the SOF start index overflow error conditions has occurred, but the nonzero SOF start index offset error condition has occurred, then the second state machine 344 signals the controller 302, the upstream processing 112 and/or downstream processing 118 about the error condition and transitions through 540 to the wait state 504, and in response, the controller 302 forces the first state machine 340 to transition from the first lock state 412 through 426 to the first search state 404 to re-initiate the frame sync acquisition process. The component mix-up error condition may not impact the operation of the second state machine 344 since it can easily be addressed by the downstream processing 118 without impacting how the subsequent input signal blocks to the frame synchronization module 116 are processed by the upstream processing 112. When provided with the error conditions, the upstreaming processing 112 can attempt to correct the error conditions in the subsequent sample-pair streams generated for input to the frame synchronization module 116.

In the second pre-lock state 512, the second state machine 344 can operate similar to the first state machine 340 in the first pre-lock state 408. In this state, the second reassembler 324 and the second lock correlator 332 operate in their respective differential modes. In this state, the second state machine 344 monitors the detection results of the second lock correlator 332 to verify that the expected SOF patterns, i.e., the SOF patterns determined to exist in the input stream 368 in the second search state 508 by the search correlator 336, can be found at the expected SOF start index in the expected sample-pair blocks of the differentially-decoded searchable (2/I,2/Q)-sample-pair stream 368 output by the second reassembler 324 in the expected valid clock cycles.

In some embodiments, differently from the first state machine 340, the second state machine 344 also checks for various error conditions. For example, as done in the second search state 508, the second state machine 344 can check for the component suppression error condition, the SOF index overflow condition, and the nonzero SOF start index offset error condition. For example, if the expected SOF patterns are found for a predetermined number of times at the expected locations as described above and none of the error conditions of interest have occurred, then the second state machine 344 transitions through 532 to an align state 516. Else, if (1) the expected SOF pattern could not be found at the expected location in one of the expected valid clock cycles; or (2) the expected SOF patterns are found for a predetermined number of times at the expected locations as described above, and the component suppression error condition has not occurred but the SOF index overflow condition has occurred, then the second state machine 344 signals the controller 302, the upstream processing 112 and/or downstream processing 118 about the error condition and transitions through 544 back to the second search state 508. Else, if (1) the 1-Lock signal is deasserted; or (2) the expected SOF patterns are found for a predetermined number of times at the expected locations as described above but either the component suppression error condition or the nonzero SOF start index offset condition or both have occurred, then the second state machine 344 signals the controller 302, the upstream processing 112 and/or downstream processing 118 about the error condition and transitions through 556 to the wait state 504, and in response, the controller 302 forces the first state machine 340 to transition from the first lock state 412 through 426 to the first search state 404 to re-initiate the frame sync acquisition process. When provided with the error conditions, the upstreaming processing 112 can attempt to correct the error conditions in the subsequent sample-pair streams generated for input to the frame synchronization module 116.

In some embodiments, it can be advantageous for the SOF patterns to be in a particular location in the synchronized first sample-pair stream 158 and the synchronized second sample-pair stream 162 output from the buffer 348. For example, it can be advantageous for the patterns to appear at the start of the first sample-pair block in each sample-pair frame in the synchronized first and second sample-pair streams 158 and 162 output from the buffer 348 In the align state 516, the second state machine 344 can verify any such condition(s).

For example, the second state machine 344 can verify that the expected SOF patterns are in the desired locations (e.g., at the beginning) in each sample-pair block in which they appear within the input stream 368. Since one of the conditions for the second state machine 344 to be able to transition from the second pre-lock state 512 to the align state 516 is that the nonzero SOF start index offset error condition has not occurred, i.e., the SOF patterns in input streams 364 and 368 output by the first and second reassemblers 320 and 324 are at the same SOF start index in their respective sample-pair blocks, i.e., zero SOF start index offset, it would suffice to check that the SOF patterns of the input stream 368 are in the desired locations. If (1) the 1-Lock signal is deasserted; or (2) the desired condition is not verified, the second state machine 344 signals the controller 302, the upstream processing 112 and/or downstream processing 118 about the error condition and transitions through 548 to the wait state 504, and in response, the controller 302 forces the first state machine 340 to transition from the first lock state 412 through 426 to the first search state 404 to re-initiate the frame sync acquisition process. When provided with the error conditions, the upstreaming processing 112 can attempt to correct the error conditions in the subsequent sample-pair streams generated for input to the frame synchronization module 116.

But if the desired conditions are verified in the align state 516, the second state machine transitions through 536 to the second lock state 520. In this state, the 2-Lock signal, i.e., the frame sync signal, is asserted. As noted, with the assertion of the 2-Lock signal, i.e., the frame sync signal, the frame synchronization module 300 is declared to have acquired the frame sync; that is, the frame synchronization module 116 has now locked onto the frames in the first sample stream 150 and onto the frames in the second sample stream 154. In this state, the second state machine 344 continues to verify that the frame sync is maintained. For example, it remains in the second lock state 520 if (1) the 1-Lock signal remains asserted; and (2) the expected SOF patterns can be found in the desired locations (e.g., at the beginning of the corresponding sample-pair blocks) within the expected sample-pair blocks in the expected valid clock cycles. Else, a predetermined number of SOF patterns could not be found at the desired locations in consecutive expected sample-pair frames, then the second state machine 344 transitions through 552 to the second search state 508. If the 1-Lock signal is deasserted, then the second state machine 344 signals the controller 302, the upstream processing 112 and/or downstream processing 118 about the error condition and transitions through 560 to the wait state 504, and in response, the controller 302 forces the first state machine 340 to transition from the first lock state 412 through 426 to the first search state 404 to re-initiate the frame sync acquisition process. When provided with the error conditions, the upstreaming processing 112 can attempt to correct the error conditions in the subsequent sample-pair streams generated for input to the frame synchronization module 116.

The foregoing description of states 504, 508, 512, 516, and 520 of the second state machine 344 is an example and variations are possible. For example, more or fewer transitions between states are possible. Similarly, there may be more or fewer states. As yet another example, conditions other than those described above can cause transitions between states. Moreover, details of operations of the states discussed above are examples only and not intended to be limiting.

When the second state machine 344 asserts the 2-Lock signal, i.e., the frame synchronization module 116 is said to have acquired the frame sync, the controller 302 sets the first and second reassemblers 320 and 324, and the first and second lock correlators 328 and 332 to operate in their respective non-differential modes. As the frame sync signal is asserted, the first state machine 340 remains in the first lock state 412 and the second state machine 344 remains in the second lock state 520, and the transition from the differential mode to the non-differential mode in the operation of the first and second reassemblers 320 and 324, and the first and second lock correlators 328 and 332 does not impact the first and second state machine 340 and 344. If the frame sync is lost, then, as discussed above, the controller 302 can either put the second state machine 344 back to the second search state 508 while keeping the first state machine 340 intact, or put the second state machine 344 back to the wait state 504 and put the first state machine 340 back to the first search state 404, reinitializing the frame sync acquisition process. Regardless of the reason for the second state machine 344's transition away from the second lock state 520, when the frame sync is lost, the controller 302 configures the first and second reassemblers 320 and 324, and the first and second lock correlators 328 and 332 to operate back in their differential modes.

In some embodiments, it can be advantageous to operate the first and second reassemblers 320 and 324, and the first and second lock correlators 328 and 332 in their non-differential modes. If operated in the non-differential mode, the first and second lock correlators 328 and 332 can be configured to determine whether any rotations occurred in the IQ space for a given input (I,Q)-sample-pair stream, i.e., whether upstream processing 112 failed to discern the correct orientation of the IQ bases vectors. For example, for some rectangular QAM modulation formats, e.g., QPSK, 16-QAM, 32-QAM, 64-QAM, etc., the upstream processing 112 might not be able to distinguish between 90-degree rotations of the underlying sample constellation diagrams during blind frequency and phase recovery since such rotations also yield valid constellation diagrams. For example, while operating in their non-differential modes, the first and second lock correlators 328 and 332 can perform additional correlations between the input sample block and the SOF-1/I, SOF-1/Q, SOF-2/I, and SOF-2/Q sample patterns and compare the strength of the resulting correlations against predetermined thresholds to determine whether any rotations were caused in the IQ space by the upstream processing 112. For example, assuming that the input (1/I,1/Q)-sample-pair stream has a match for SOF-1/* patterns. If continued to be operated in the differential mode, no further information can be gained from the first lock correlator 328. However, if the first lock correlator 328 is configured to operate in the non-differential mode, for example, in the case of a 90-degree rotation in the input (1/I,1/Q)-sample-pair stream, the first lock correlator 328 can detect such a rotation since it would obtain a negative SOF-1/Q in the 1/I-sample stream and a SOF-1/I in the 1/Q-sample stream. Such information could then be provided to the upstream processing 112 and/or downstream processing 118 for correction.

Following the frame synchronization module 116 having asserted the frame sync signal, the buffer 348 now accepts sample blocks from the incoming first and second sample streams 150 and 154, and after a predetermined amount of delay, presents these buffered sample blocks as first and second synchronized sample streams 158 and 162 to the downstream processing 118.

Figure 6:
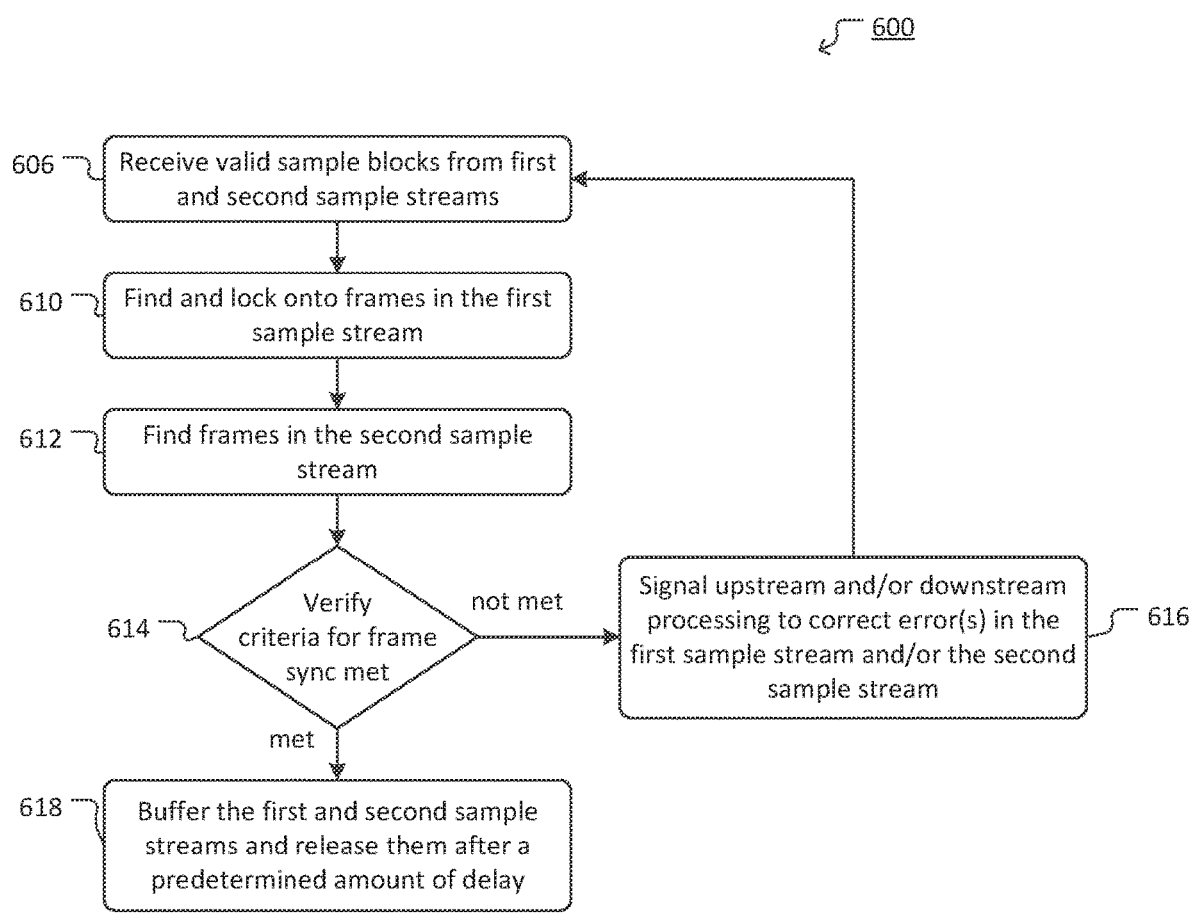
FIG. 6 is shows an example of a method by which a frame synchronization module can operate according to some embodiments of the invention.

FIG. 6 illustrates another example of a process 600 by which the synchronization module 300 can operate. As shown, at 606, the frame synchronization module 300 can execute the process 600 when it receives valid sample blocks (e.g., indicated by the control signal(s) 156) in its input first and second sample streams 150 and 154. At 610, the first state machine 340 can find and lock onto frames in the first sample stream 150, which it can do as illustrated in FIG. 4 and discussed above. At 612 and 614, the second state machine 344 can find and lock onto the frames in the second sample stream 154 after verifying that certain criteria are met based on the information that it collects from various elements of the frame synchronization module 300 through signals 370 about the SOF patterns in the sample frames of the first and second sample streams 150 and 154, which it can do as illustrated in FIG. 5 and discussed above.

Examples of such criteria include criteria discussed above. If not all the criteria are met, the method branches to 616, where upstream processing 112 and/or downstream processing 118 are signaled to fix the error(s) as discussed above. The process 600 then proceeds to 606 where the frame synchronization module 300 can wait for next valid sample blocks in the first and second sample streams 150 and 154 to be received at the frame synchronization module 300.

If (e.g., all the criteria) are met in 614, the process 500 moves to 618, where the buffered sample blocks of the first and second sample streams 150 and 154 can be released from the buffer 348 as discussed above.

The elements of FIG. 3 can be implemented in software, hardware (e.g., digital logic and/or analog circuits), and/or a combination of the foregoing. Any such software, for example, can reside in a digital memory (not shown) from which it is executed by the controller 302 or other controllers or processors (not shown). The operations illustrated by FIGS. 4-6 or otherwise discussed or described herein can be effected by such software and/or the hardware mentioned above.

Although specific embodiments and applications have been described in this specification, these embodiments and applications are exemplary only, and many variations are possible. In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

We claim:

1. A frame synchronization module comprising:
   a reassembler configured to produce first searchable digital sample blocks from a first stream of first digital sample blocks associated with a first signal and second searchable digital sample blocks from a second stream of second digital sample blocks associated with a second signal;
   a search correlator configured to find a first unique word (UW) pattern in the first searchable digital sample blocks and a second UW pattern in the second searchable digital sample blocks; and
   a buffer configured to store the first digital sample blocks and the second digital sample blocks and release the buffered first and second digital sample blocks for flow downstream when the stream of first digital sample blocks and the stream of second digital sample blocks are aligned to a clock index associated with the first and second UW patterns with respect to the first and second digital sample blocks, respectively.

2. The system of claim 1, wherein the buffer is configured to concatenate the buffered first and second digital sample blocks into a single serial stream for flow downstream when the stream of first digital sample blocks and the stream of second digital sample blocks are aligned to the clock index associated with the first and second UW patterns with respect to the first and second digital sample blocks, respectively.

3. The system of claim 1, wherein the reassembler is configured to decode the first digital sample blocks and the second digital sample blocks to produce the first searchable digital sample blocks and second searchable digital sample blocks, respectively.

4. The system of claim 3, wherein the decoding is implemented as one-bit hard-decision in-phase and quadrature-phase sample pairs.

5. The system of claim 3, wherein the reassembler is configured to initially differentially decode the first digital sample blocks and the second digital sample blocks in a differential mode.

6. The system of claim 5, wherein the reassembler is configured to switch to a non-differential mode when the stream of first digital sample blocks and the stream of second digital sample blocks are aligned to the clock index associated with the first and second UW patterns with respect to the first and second digital sample blocks, respectively.

7. The system of claim 6, wherein the first UW pattern and the second UW pattern are each different when differentially decoded relative to non-differentially decoded.

8. The system of claim 1, wherein each of the first and second UW patterns comprises a start-of-frame (SoF) pattern associated with a first digital sample block of a given frame, wherein the search correlator is configured to find the SoF pattern in the first and second searchable digital sample blocks to align the stream of first digital sample blocks and the stream of second digital sample blocks to the clock index associated with the SoF patterns corresponding to the respective first and second UW patterns, with respect to the first and second digital sample blocks, respectively.

9. The system of claim 1, wherein each of the first and second digital sample blocks are organized into sequential frames that each include at least one of the first and second UW patterns-respectively, wherein the search correlator is configured to transition from a search state to a pre-lock state in response to finding the first and second UW patterns in the respective first and second searchable digital sample blocks, and is further configured to transition from the pre-lock state to a lock state in response to finding the first and second UW patterns at a specific indexed location in each of a predetermined plurality of the sequential frames, and is further configured to transition from the pre-lock state back to the search state in response to not finding the first and second UW patterns at the specific indexed location in each of a predetermined plurality of the sequential frames.

10. The system of claim 1 further comprising:
    a first lock correlator configured to find the first UW pattern in the first searchable digital sample blocks;
    a second lock correlator configured to find the second UW pattern in the second searchable digital sample blocks; and
    a controller configured to determine whether the first and second UW patterns indicate that the stream of first digital sample blocks and the stream of second digital sample blocks are aligned to the clock index associated with the first and second UW patterns with respect to the first and second digital sample blocks, respectively.

11. The system of claim 10, wherein the controller is configured to provide an error indication to upstream processing components in response to the second lock correlator identifying an error in attempting to find the second UW pattern in the second searchable digital sample blocks after the first lock correlator finds the first UW pattern in the first searchable digital sample blocks.

12. The system of claim 1, wherein:
the reassembler comprises:
a first reassembler configured to selectively differentially or non-differentially decode the first digital sample blocks to produce the first searchable digital sample blocks, and
a second reassembler configured to selectively differentially or non-differentially decode the second digital sample blocks to produce the second searchable digital sample blocks; and
the system further comprising:
a first lock correlator configured to selectively search in the first searchable digital sample blocks for a differentially decoded version of the first UW pattern or a non-differentially decoded version of the first UW pattern; and
a second lock correlator configured to selectively search in the second searchable digital sample blocks for a differentially decoded version of the second UW pattern or a non-differentially decoded version of the second UW pattern.

13. The system of claim 12 further comprising a controller configured to:
in a frame synchronization acquisition phase:
set the first reassembler to differentially decode the first digital sample blocks,
set the second reassembler to differentially decode the second digital sample blocks,
set the first lock correlator to search the first searchable digital sample blocks output by the first reassembler for the differential version of the first UW pattern, and
set the second lock correlator to search the second searchable digital sample blocks output by the second reassembler for the differential version of the second UW pattern;
switch from the frame synchronization acquisition phase to a frame synchronization maintenance phase when the stream of first digital sample blocks and the stream of second digital sample blocks are aligned to the clock index associated with the first and second UW patterns with respect to the first and second digital sample blocks, respectively; and
in the frame synchronization maintenance phase:
set the first reassembler to non-differentially decode the first digital sample blocks,
set the second reassembler to non-differentially decode the second digital sample blocks,
set the first lock correlator to search the first searchable digital sample blocks output by the first reassembler for the non-differentially-decoded version of the first UW pattern, and
set the second lock correlator to search the second searchable digital sample blocks output by the second reassembler for the non-differentially-decoded version of the second UW pattern.

14. The system of claim 1 further comprising a controller configured to provide an indication of a signal swap between the first digital sample blocks and the second digital sample blocks to upstream processing components in response to detecting the first UW pattern in the second searchable digital sample blocks or detecting the second UW pattern in the first searchable digital sample blocks.

15. The system of claim 1, wherein each of the samples of the first stream of the first digital sample blocks and the second stream of the second digital sample blocks comprises an in-phase component and a quadrature-phase component.

16. The system of claim 1, wherein the first signal and the second signal are mutually orthogonal with respect to each other.

17. The system of claim 16, wherein the first stream of the first digital sample blocks and the second stream of the second digital sample blocks collectively correspond to an optical signal, wherein the first stream of the first digital sample blocks and the second stream of the second digital sample blocks each correspond to linearly-polarized mutually orthogonal optical signal components.

18. A method for synchronizing first digital sample blocks arranged in a first frame and second digital sample blocks arranged in a second frame, the method comprising:
finding a first UW pattern associated with the first frame in first searchable digital sample blocks corresponding to the first digital sample blocks;
finding a second UW pattern associated with the second frame in second searchable digital sample blocks corresponding to the second digital sample blocks;
storing the first digital sample blocks and the second digital sample blocks in a buffer;
aligning a clock index associated with the first and second UW patterns with respect to the first and second digital sample blocks, respectively; and
releasing the stored first digital sample blocks and the stored second digital sample blocks from the buffer in response to aligning the clock index associated with the first and second UW patterns with respect to the first and second digital sample blocks.

19. The method of claim 18, wherein releasing the stored first digital sample blocks and the stored second digital sample blocks comprises concatenating the buffered first and the second digital sample blocks into a single serial stream for flow downstream in response to aligning the clock index associated with the first and second UW patterns with respect to the first and second digital sample blocks.

20. The method of claim 18 further comprising decoding the first and second digital sample blocks to produce the first and second searchable digital sample blocks, respectively.

21. The method of claim 20, wherein decoding the first and second sample blocks comprises implementing a one-bit hard-decision decoding on each of an in-phase and a quadrature-phase sample component pair associated with each of the first and second searchable sample blocks, respectively.

22. The method of claim 20, wherein decoding the first and second sample blocks comprises:
differentially decoding the first digital sample blocks and the second digital sample blocks in an initial differential mode; and
non-differentially decoding the first digital sample blocks and the second digital sample blocks in a non-differential mode in response to aligning the clock index associated with the first and second UW patterns with respect to the first and second digital sample blocks.

23. The method of claim 18, wherein the first frame is one of a plurality of first sequential frames and the second frame is one of a plurality of second sequential frames, the method further comprising:
switching a controller state machine from a search state to a pre-lock state in response to finding the first and second UW patterns in the respective first and second searchable digital sample blocks; and switching the controller state machine from the pre-lock state to a lock state in response to finding the first and second UW patterns at a specific clock indexed location in each of a predetermined plurality of the respective first and second sequential frames; and switching the controller state machine from the pre-lock state back to the search state in response to not finding the first and second UW patterns at the specific clock indexed location in each of a predetermined plurality of the respective first and second sequential frames.

24. The method of claim 18, wherein:

finding the second UW pattern associated with the second frame comprises finding the second UW pattern in response to finding the first UW pattern associated with the first frame, and aligning the clock index comprises aligning the clock index associated with the first and second UW patterns with respect to the first and second digital sample blocks, respectively, in response to finding the second UW pattern, the method further comprising providing an error indication to upstream processing components in response to identifying an error in attempting to find the second UW pattern in the second searchable digital sample blocks.

25. The method of claim 18, wherein finding the first and second UW patterns in the first and second searchable digital sample blocks comprises:

differentially decoding the first and second digital sample blocks to produce the first and second searchable digital sample blocks, respectively, and searching the first and second searchable digital sample blocks for differentially decoded versions of the first and second UW patterns, respectively.

26. The method of claim 25 further comprising, after aligning the clock index with respect to the first and second digital sample blocks, respectively:

non-differentially decoding the first digital sample blocks and the second digital sample blocks to produce non-differentially decoded first searchable digital sample blocks and non-differentially decoded second searchable digital sample blocks; and verifying that non-differentially decoded versions of the first and second UW patterns are found in expected clock indexed locations in the non-differentially decoded first searchable digital sample blocks and non-differentially decoded second searchable digital sample blocks, respectively.

27. The method of claim 18, further comprising:

detecting a signal swap associated with detection of the first UW pattern in the second searchable digital sample blocks or detecting the second UW pattern in the first searchable digital sample blocks; and providing an indication of a signal swap between the first digital sample blocks and the second digital sample blocks to upstream processing components in response to detecting the signal swap.

28. The method of claim 18, wherein the first digital sample blocks and the second digital sample blocks collectively correspond to an optical signal, wherein the first digital sample blocks and the second digital sample blocks each correspond to linearly-polarized mutually orthogonal optical signal components.

\* \* \* \* \*